3,828,044
5-(3,4,5-TRIMETHOXYBENZYL)-BARBITURIC ACIDS

Berislav Gluncic and Nedjeljko Kujundzic, Zagreb, Yugoslavia, assignors to PLIVA, Pharmaceutical and Chemical Works, Zagreb, Yugoslavia
No Drawing. Filed Apr. 5, 1972, Ser. No. 241,435
Claims priority, application Yugoslavia, Feb. 5, 1971, 263/71
Int. Cl. C07d 51/20
U.S. Cl. 260—257          3 Claims

ABSTRACT OF THE DISCLOSURE

The invention disclosed provides 5-(3,4,5-Trimethoxybenzyl)-barbituric acid, substituted derivatives thereof and a process for their preparation.

---

The invention relates to 5-(3,4,5-trimethoxybenzyl)-barbituric acid and derivatives substituted in postion 5, of the general formula

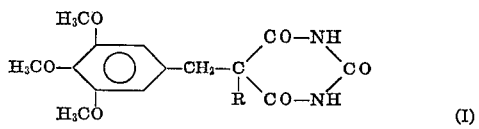

(I)

wherein R is H, alkyl or alkenyl radical containing 1 to 10 carbon atoms in the chain, such as $CH_3$, $C_2H_5$, n—$C_3H_7$ iso-$C_3H_7$, n—$C_4H_9$, $CH_2$—$CH$=$CH_2$, n—$C_{10}H_{21}$, or arylalkyl radical, such as 5-trimethoxybenzyl radical, as well as to a process for their preparation.

The compounds obtained by this process have not been described in literature to date. They show a considerable sedative, hypnotic and diuretic activity and act to induce a prolonged narcosis.

It has been found that the above compounds can easily be prepared by dropwise addition to a mixture of a substituted ester of (1)3,4,5-trimethoxy-benzylmalonic acid of the general formula

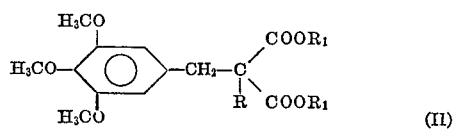

(II)

wherein R has the meaning as above, and $R_1$ is methyl, ethyl or n-butyl radical; (2) of an anhydrous alcohol, such as methanol, ethanol or n-butanol; (3) and (3) of urea, of a solution of a sodium alkoxide, such as sodium methylate, ethylate or butylate, in an anhydrous alcohol, such as methanol, ethanol or n-butanol, at the boiling temperature of the reaction mixture in a period of time of 1 to 4 hours with heating continued for a period of time of 1 to 7 hours, preferably so that the total period of time for dropwise addition and condensation is 8 to 10 hours. The solvent is then distilled off, the residue dissolved in cold water, the water solution extracted with a water-immiscible solvent, such as chloroform, benzene or ether, and acidified by introducing gaseous $CO_2$ or diluted hydrochloric acid. The precipitated crystals are subsequently recovered and recrystallized from diluted alcohol, such as methanol, ethanol or propanol.

The process is illustrated by the following examples:

EXAMPLE 1

5-(3,4,5-Trimethoxybenzyl)-barbituric acid

To a mixture of 2.0 gs. (0.006 moles) of diethylester of 3,4,5-trimethoxy-benzylmalonic acid, 0.55 gs. (0.009 moles) of urea, and 10 mls. of absolute ethanol were added dropwise 6.5 mls. (0.013 moles) of a 2 N solution of sodium ethylate at the boiling temperature of the reaction mixture in a period of 2 hours with heating at the same temperature continued for an additional 6 hours. After distilling off the solvent, the residue was dissolved in 15 mls. of water, the solution extracted with ether, and then acidified to a pH of 3 with diluted hydrochloric acid. After recrystallization of precipitated crystals from ethanol, 5-(3,4,5-trimethoxybenzyl)-barbituric acid was obtained having a melting point 139 to 141° C.

EXAMPLE 2

5-Methyl-5-(3,4,5-trimethoxybenzyl)-barbituric acid

From dimethylester of 2-methyl-2-(3,4,5-trimethoxybenzyl)-malonic acid by condensation with urea in methanol and in the presence of sodium methylate as the condensing agent, according to the procedure of Example 1, there was obtained the 5-methyl-5-(3,4,5-trimethoxybenzyl)-barbituric acid having a melting point 191 to 193° C.

EXAMPLE 3

5-Ethyl-5-(3,4,5-trimethoxybenzyl)-barbituric acid

From diethylester of 2-ethyl-2-(3,4,5-trimethoxybenzyl)-malonic acid by condensation with urea according to the procedure of Example 1, except that diluted hydrochloric acid was replaced by gaseous $CO_2$, there was obtained 5-ethyl-5-(3,4,5-trimethoxybenzyl)-barbituric acid having a melting point of 188 to 189° C.

EXAMPLE 4

5-n-Propyl-5-(3,4,5-trimethoxybenzyl)-barbituric acid

By condensing diethylester of 2-n-propyl-2-(3,4,5-trimethoxybenzyl)-malonic acid with urea according to the procedure of Example 3, there was obtained 5-n-propyl-5-(3,4,5-trimethoxybenzyl)-barbituric acid having a melting point of 185 to 186° C.

EXAMPLE 5

5-(i-Propyl-5-(3,4,5-trimethoxybenzyl)-barbituric acid

By condensing diethylester of 2-i-propyl-2-(3,4,5-trimethoxybenzyl)-malonic acid with urea according to the procedure of Example 3, there was obtained 5-i-propyl-5-(3,4,5-trimethoxybenzyl)-barbituric acid having a melting point of 176 to 178° C.

EXAMPLE 6

5-n-Butyl-5-(3,4,5-trimethoxybenzyl)-barbituric acid

By condensing dibutylester of 2-n-butyl-2-(3,4,5-trimethoxybenzyl)-malonic acid with urea in the presence of sodium butylate as condensing agent according to the procedure of Example 2, there was obtained 5-n-butyl-5-(3,4,5-trimethoxybenzyl)-barbituric acid having a melting point of 176 to 177° C.

EXAMPLE 7

5-n-Decyl-5-(3,4,5-trimethoxybenzyl)-barbituric acid

By condensing diethylester of 2-n-decyl-2-(3,4,5-trimethoxybenzyl)-malonic acid with urea according to the procedure of Example 3, there was obtained 5-n-decyl-5-(3,4,5-trimethoxybenzyl)-barbituric acid having a melting point of 147 to 148° C.

EXAMPLE 8

5-Allyl-5-(3,4,5-trimethoxybenzyl)-barbituric acid

By condensing diethylester of 2-allyl-2-(3,4,5-trimethoxybenzyl)-malonic acid with urea according to the procedure of Example 3, there was obtained 5-allyl-5-(3,4,5-trimethoxybenzyl)-barbituric acid having a melting point of 180 to 181° C.

EXAMPLE 9

5,5-Bis-(3,4,5-trimethoxybenzyl)-barbituric acid

By condensing diethylester of 2,2-bis-(3,4,5-trimethoxybenzyl)-malonic acid with urea according to the procedure of Example 3, there was obtained 5,5-bis-(3,4,5-trimethoxybenzyl)-barbituric acid having a melting point of 265 to 266° C.

What we claim is:
1. 5-n-Butyl-5-(3,4,5-trimethoxybenzyl)-barbituric acid.
2. 5-n-Decyl-5-(3,4,5-trimethoxybenzyl)-barbituric acid.
3. 5,5-Bis-(3,4,5-trimethoxybenzyl)-barbituric acid.

References Cited

UNITED STATES PATENTS 3,464,990    9/1969    Brossi et al. _____ 260—257

OTHER REFERENCES

Trivedi et al.: Barbiturates Part I, J. of Indian Chem. Soc. vol. 35, No. 9, 1958 (661–664).

Trivedi et al.: Barbiturates Part II, J. of Indian Chem. Soc., vol. 35, No. 9, 1958 (687–689).

DONALD G. DAUS, Primary Examiner

A. M. T. TIGHE, Assistant Examiner

U.S. Cl. X.R.

424—254; 260—473 R